US007955439B2

(12) United States Patent  
Stanley et al.

(10) Patent No.: US 7,955,439 B2  
(45) Date of Patent: Jun. 7, 2011

(54) ENZYME-RESISTANT STARCH AND METHOD FOR ITS PRODUCTION

(75) Inventors: Keith D. Stanley, St. Louis Park, MN (US); Ethel D. Stanley, legal representative, St. Louis Park, MN (US); Patricia A. Richmond, Mount Zion, IL (US); Walter C. Yackel, Blaine, WA (US); Donald W. Harris, Springfield, IL (US); Thomas A. Eilers, Decatur, IL (US); Eric A. Marion, Decatur, IL (US)

(73) Assignee: Tate & Lyle Ingredients Americas LLC, Wilmington, DE (US)

( * ) Notice: Subject to any disclaimer, the term of this patent is extended or adjusted under 35 U.S.C. 154(b) by 0 days.

(21) Appl. No.: 12/788,388

(22) Filed: May 27, 2010

(65) Prior Publication Data

US 2010/0252031 A1 Oct. 7, 2010

Related U.S. Application Data

(62) Division of application No. 11/550,059, filed on Oct. 17, 2006, now Pat. No. 7,754,017, which is a division of application No. 10/961,383, filed on Oct. 8, 2004, now Pat. No. 7,189,288.

(51) Int. Cl.  
*C08B 30/12* (2006.01)

(52) U.S. Cl. .......................................... 127/71; 536/102

(58) Field of Classification Search .................. 536/102; 127/32, 71  
See application file for complete search history.

(56) References Cited

U.S. PATENT DOCUMENTS

| | | | |
|---|---|---|---|
| 2,613,206 A | 10/1952 | Caldwell | 260/233.5 |
| 2,661,349 A | 12/1953 | Caldwell et al. | 260/224 |
| 3,729,380 A | 4/1973 | Sugimoto et al. | 195/31 R |
| 4,626,288 A | 12/1986 | Trzasko et al. | 106/210 |
| 4,937,091 A | 6/1990 | Zallie et al. | 426/582 |
| 5,089,171 A | 2/1992 | Chiu | 252/315.3 |
| 5,281,276 A | 1/1994 | Chiu et al. | 127/65 |

(Continued)

FOREIGN PATENT DOCUMENTS

EP 363741 A2 4/1990

(Continued)

OTHER PUBLICATIONS

Donovan et al., *Cereal Chemistry* 60(5):381-387 (1983).

(Continued)

*Primary Examiner* — David M Brunsman  
(74) *Attorney, Agent, or Firm* — Williams, Morgan & Amerson, P.C.

(57) ABSTRACT

A process for producing an enzyme-resistant starch uses an aqueous feed composition that comprises (i) starch that contains at least about 50% by weight amylose, (ii) water, and (iii) alcohol. The concentration of starch in the feed composition is between about 5% and about 50% by weight, and the pH of the feed composition is between about 3.5 and about 6.5. In a first heating step, the feed composition is heated to a temperature between about 130-170° C. for about 0.1-3.0 hours. The feed composition is cooled to a temperature between about 4-70° C. for about 0.1-6.0 hours. In a second heating step, the feed composition is heated to a temperature between about 110-150° C. for about 0.1-10.0 hours. The starch is separated from the majority of the water and alcohol and is dried.

2 Claims, 5 Drawing Sheets

U.S. PATENT DOCUMENTS

| | | | |
|---|---|---|---|
| 5,368,878 A | 11/1994 | Smick et al. | 426/646 |
| 5,372,835 A | 12/1994 | Little et al. | 426/573 |
| 5,376,399 A | 12/1994 | Dreese et al. | 426/658 |
| H1394 H | 1/1995 | Dreese | 426/603 |
| H1395 H | 1/1995 | Prosser | 426/633 |
| 5,378,286 A | 1/1995 | Chiou et al. | 127/36 |
| 5,378,491 A | 1/1995 | Stanley et al. | 426/661 |
| 5,387,426 A | 2/1995 | Harris et al. | 426/573 |
| 5,395,640 A | 3/1995 | Harris et al. | 426/573 |
| 5,409,542 A | 4/1995 | Henley et al. | 127/65 |
| 5,436,019 A | 7/1995 | Harris et al. | 426/573 |
| 5,496,861 A | 3/1996 | Rouse et al. | 514/778 |
| 5,593,503 A | 1/1997 | Shi et al. | 127/71 |
| 5,711,986 A | 1/1998 | Chiu et al. | 426/658 |
| 5,714,600 A | 2/1998 | McNaught et al. | 536/102 |
| 5,849,090 A | 12/1998 | Haralampu et al. | 127/65 |
| 5,886,168 A | 3/1999 | Brumm | 536/103 |
| 5,902,410 A | 5/1999 | Chiu et al. | 127/71 |
| 5,904,941 A | 5/1999 | Xu et al. | 426/52 |
| 6,013,299 A | 1/2000 | Haynes et al. | 426/549 |
| 6,043,229 A | 3/2000 | Kettlitz et al. | 514/60 |
| 6,054,302 A | 4/2000 | Shi et al. | 435/95 |
| 6,113,976 A | 9/2000 | Chiou et al. | 426/661 |
| 6,274,567 B1 | 8/2001 | Brown et al. | 514/60 |
| 6,303,174 B1 | 10/2001 | McNaught et al. | 426/549 |
| 6,348,452 B1 | 2/2002 | Brown et al. | 514/60 |
| 6,352,733 B1 | 3/2002 | Haynes et al. | 426/549 |
| 6,468,355 B1 | 10/2002 | Thompson et al. | 127/71 |
| 6,528,498 B2 | 3/2003 | Brown et al. | 514/60 |
| 6,623,943 B2 | 9/2003 | Schmiedel et al. | 435/98 |
| 6,664,389 B1 | 12/2003 | Shi et al. | 536/102 |
| 6,670,155 B2 | 12/2003 | Antrim et al. | 435/95 |
| 6,844,172 B2 | 1/2005 | Bergsma et al. | 435/98 |
| 6,890,571 B2 | 5/2005 | Shi et al. | 426/28 |
| 6,896,915 B2 | 5/2005 | Shi et al. | 426/20 |
| 6,929,815 B2 | 8/2005 | Bengs et al. | 426/578 |
| 6,929,817 B2 | 8/2005 | Shi et al. | 426/661 |
| 7,081,261 B2 | 7/2006 | Shi et al. | 426/28 |
| 7,189,288 B2 * | 3/2007 | Stanley et al. | 127/71 |
| 7,744,944 B2 * | 6/2010 | Binder et al. | 426/661 |
| 7,754,017 B2 * | 7/2010 | Stanley et al. | 127/32 |
| 2002/0162138 A1 | 10/2002 | Kossmann et al. | 800/284 |
| 2002/0192291 A1 | 12/2002 | Bergsma et al. | 424/488 |
| 2003/0045504 A1 | 3/2003 | Brown et al. | 514/60 |
| 2003/0134394 A1 | 7/2003 | Antrim et al. | 435/95 |
| 2003/0215499 A1 | 11/2003 | Shi et al. | 424/465 |
| 2003/0215561 A1 | 11/2003 | Shi et al. | 426/661 |
| 2003/0215562 A1 | 11/2003 | Shi et al. | 426/661 |
| 2003/0219520 A1 | 11/2003 | Shi et al. | 426/549 |
| 2004/0092732 A1 | 5/2004 | Antrim et al. | 536/123.13 |
| 2006/0263503 A1 | 11/2006 | Okoniewska et al. | 426/549 |
| 2010/0183797 A1 * | 7/2010 | Yamaku et al. | 426/661 |

FOREIGN PATENT DOCUMENTS

| | | |
|---|---|---|
| EP | 486936 A1 | 5/1992 |
| EP | 487000 A1 | 5/1992 |
| EP | 529893 A1 | 3/1993 |
| EP | 529894 A1 | 3/1993 |
| EP | 553368 A1 | 8/1993 |
| EP | 0 499 648 B1 | 12/1993 |
| EP | 806434 A1 | 11/1997 |
| EP | 0 688 872 B1 | 3/1999 |
| EP | 1 088 832 A1 | 4/2001 |
| EP | 1 362 517 A1 | 11/2003 |
| EP | 1 362 869 | 11/2003 |
| JP | 04290809 A | 10/1992 |
| JP | 10080294 A | 3/1998 |
| JP | 10191931 A | 7/1998 |
| JP | 231469 A | 8/2001 |
| WO | WO93/03629 | 3/1993 |
| WO | WO96/08261 | 3/1996 |
| WO | WO00/14249 | 3/2000 |
| WO | WO2005/040223 | 5/2005 |
| WO | WO2006/041563 | 4/2006 |

OTHER PUBLICATIONS

Kobayashi, *Denpun Kagaku* 40(3):285-290 (1993) (English translation attached).

Krueger et al., *Journal of Food Science* 52(3):715-718 (May-Jun. 1987).

Sievert et al., *Cereal Chemistry* 66:342-347 (1989).

Sievert et al., *Cereal Chemistry* 67:217-221 (1990).

Stute, *Starch/Stärke* 44(6):205-214 (1992).

* cited by examiner

Bragg Angle, 2 Θ

ENZYME-RESISTANT STARCH AND METHOD FOR ITS PRODUCTION

This is a divisional of application Ser. No. 11/550,059, filed Oct. 17, 2006 now U.S. Pat. No. 7,754,017, which is a divisional of application Ser. No. 10/961,383, filed Oct. 8, 2004 now U.S. Pat. No. 7,189,288.

BACKGROUND OF THE INVENTION

Starch comprises two polysaccharides: amylose and amylopectin. Amylose is a generally linear polymer of glucose units connected by alpha 1-4 glycosidic linkages. Amylopectin is a branched polymer in which many of the glucose units are connected by alpha 1-4 glycosidic linkages, but some are connected by alpha 1-6 glycosidic linkages.

Alpha-amylase is an enzyme that is present in the human body and which hydrolyzes alpha 1-4 linkages in starch, thus leading to digestion of the starch. In certain situations it is desirable to produce starch that resists hydrolysis by alpha-amylase, for example to decrease the caloric content of the starch, or to increase its dietary fiber content. However, attempts to produce such starch in the past have suffered from one or more problems, such as process complexity and expense, product handling difficulties, or acceptable performance in food systems. As one specific example, some alpha amylase-resistant starches have tended to comprise fine particulates which are difficult to separate from an aqueous phase.

There is a need for improved starches that are resistant to alpha-amylase and that can withstand severe food processing conditions of heating and shearing, and for improved processes for making such starches.

SUMMARY OF THE INVENTION

One embodiment of the invention is a process for producing starch that comprises an alpha-amylase resistant component. The process comprises providing an aqueous feed composition that comprises (i) starch that contains at least about 50% by weight amylose, (ii) water, and (iii) alcohol. The concentration of starch in the feed composition is between about 5% and about 50% by weight, and the pH of the feed composition is between about 3.5 and about 6.5, or in some embodiments, between about 4.0 and about 6.5. In a first heating step, the feed composition is heated to a temperature between about 130-170° C. for about 0.1-3.0 hours. The composition is cooled to a temperature between about 4-70° C. for about 0.1-6.0 hours. In a second heating step, the composition is heated to a temperature between about 110-150° C. for about 0.1-10.0 hours. The starch is separated from the majority of the water and alcohol, and is dried.

Another embodiment of the invention is starch comprising an alpha-amylase resistant component, which is produced by the above-described process.

Another embodiment of the invention is a method of making an alpha-amylase resistant starch, which comprises heating high amylose starch in aqueous alcohol to a temperature above its gelatinization temperature, thereby destroying its native molecular structure; maintaining the mixture at or above the gelatinization temperature until the molecular weight of the starch has been reduced to a desirable range; and cooling the starch. Yet another embodiment is a method of making an alpha-amylase resistant starch that comprises treating high amylose starch with aqueous acid to reduce its molecular weight to a desirable range; neutralizing the starch-water mixture with a base; concentrating or drying the starch; mixing the starch with alcohol and heating to an extent sufficient to gelatinize the starch, thereby destroying its native molecular structure; and cooling the starch. Still another embodiment is a method of making an alpha-amylase resistant starch that comprises gelatinizing high amylose starch in alcohol at elevated temperature; and reducing the temperature of the starch below a resistant starch melting point for a period of time sufficient for re-organization of the molecular structure to impart alpha-amylase resistance and heat and shear tolerance. In each of these embodiments, the process optionally can further comprise separating the starch from the alcohol and treating the starch with elevated heat and moisture to impart alpha-amylase resistance.

Another embodiment of the invention is starch comprising an alpha-amylase resistant component, which is characterized by having substantially lost its native crystalline structure and having obtained a new crystalline structure; has a differential scanning calorimetry melting point of about 150° C. at an enthalpy of about 5-20 Joules/gram; and a water holding capacity less than about 3 grams of water per gram of dry starch. About 82-90% by weight of the starch has a molecular weight less than about 350,000, and about 20-35% by weight of the starch has a molecular weight less than about 10,000. In certain embodiments, the starch has a peak melting temperature of at least about 115° C., or at least about 130° C. In certain embodiments, the starch has a heat of gelatinization of at least about 16 Joules/gram, or has a differential scanning calorimetry melting point at about 150° C.

Another embodiment of the invention is a food product that comprises starch that comprises an alpha-amylase resistant component. The starch is as described above, and can be used as an ingredient when preparing the food product. Specific examples of such food products include baked foods and foods produced by extrusion or by processes involving heating and shearing, among others.

DESCRIPTION OF SPECIFIC EMBODIMENTS

Figure 1:
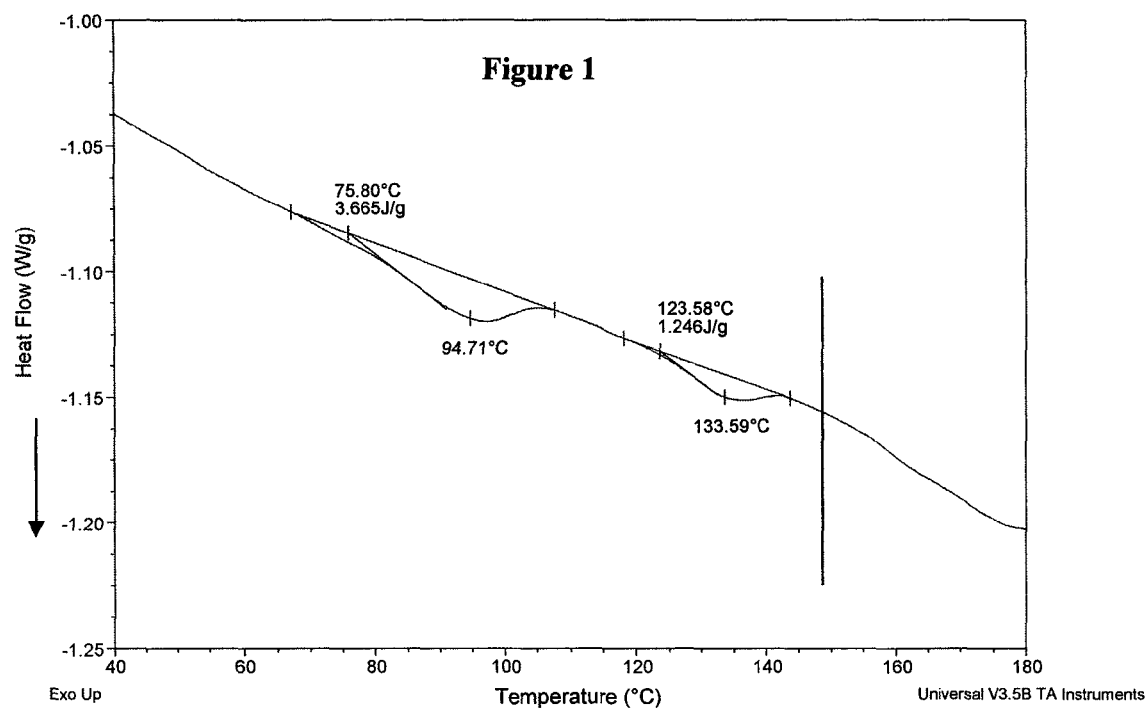
FIG. 1 is a thermogram showing the results of differential scanning calorimetry performed on HS-7 high amylose starch. The sample contained 20% dry solids and was prepared with a 50% ethanol solution.

Alpha-amylase resistant starch is produced from an aqueous feed composition. The feed composition comprises (i) starch that contains at least about 50% by weight amylose, (ii) water, and (iii) alcohol. In some embodiments of the process, the starch in the feed composition comprises at least about 65% by weight amylose. The starch used in the feed composition can come from a variety of sources, including high amylose starches obtained from dent corn, high amylose ae genetic corn (ae is the name of a genetic mutation commonly known by corn breeders and is short for "amylose extender"), potato, tapioca, rice, pea, wheat varieties, as well as purified amylose from these starches, and alpha-1,4 glucans produced according to international patent application WO 00/14249, which is incorporated herein by reference.

Chemically modified starches, such as hydroxypropyl starches, starch adipates, acetylated starches, and phosphorylated starches, can also be used in the present invention to produce resistant starch. For example, suitable chemically modified starches include, but are not limited to, crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications are known in the art, for example in Modified Starches: Properties and Uses, Ed. Wurzburg, CRC Press, Inc., Florida (1986). Other suitable modifications and methods are disclosed in U.S. Pat. Nos. 4,626,288, 2,613,206 and 2,661,349, which are incorporated herein by reference.

Suitable alcohols include, but are not limited to, ethanol, methanol, and isopropanol.

The concentration of starch in the feed composition is between about 5% and about 50% by weight, preferably between about 5% and about 40%, more preferably between about 5% and about 30%, or in certain specific embodiments of the process, between about 8% and about 25% by weight. The proportions of alcohol and water in the composition can vary, but suitable examples can range from about 40% alcohol/60% water to about 70% alcohol/30% water (by weight). The pH of the feed composition is between about 3.5 and about 6.5, or in certain embodiments, between about 4.0 and about 6.5, or about 4.7 and about 5.3.

The feed composition is placed in a pressure reactor. In a first heating step, the feed composition is heated to a temperature between about 130-170° C. for about 0.1-3.0 hours, or in certain embodiments, between about 145-160° C. for about 0.5-2.0 hours. Without being bound by theory, it is believed that this first heating step melts some crystallites, typically most or all of the crystallites, that are present in the starch.

The feed composition is then cooled to a temperature between about 4-70° C., typically from 20 to 70° C., for about 0.1-6.0 hours, or in certain embodiments, between about 35-45° C. for about 1.0-4.0 hours. Without being bound by theory, it is believed that this cooling step promotes crystallite formation and increases the amount of amylase-resistant starch in the composition.

In a second heating step, the feed composition is heated to a temperature between about 110-150° C. for about 0.1-10.0 hours, or in certain embodiments, between about 120-140° C. for about 1.0-5.0 hours, or between about 130-140° C. for about 1.0-5.0 hours. This second heating step is believed to promote crystallite growth.

The reactor contents, which now contain a higher percentage of amylase-resistant starch than at the outset of the process, are then cooled (for example, to about 25° C.). The starch is separated from the majority of the water and alcohol. "Majority" in this context means that more than 50% by weight of the water and alcohol are removed from the composition. In some embodiments, more than 80% or even 90% by weight of the water and alcohol are removed in this step. The separation can be performed by filtration, centrifugation, other separation techniques known to those skilled in the art, or a combination of such methods.

The starch is then dried. For example, a tray dryer or flash dryer can be used to remove moisture from the wet starch cake, although other drying techniques could be used as well. Water removal is called dehydration, and alcohol removal is called desolventizing. Although these process steps may be two separate operations, collectively they are often called drying. Removal of residual alcohol to low, levels can be accomplished by treatment with humid air, typically at about 100° C. The dry starch product optionally can be milled to reduce its particle size. Persons skilled in this art will understand that a "dry starch product" normally does not have 0% moisture content, but has a low enough moisture content to be considered "dry" for commercial purposes.

Optionally, the cooling step and the second heating step can be repeated in sequence one or more times before the starch is separated from the water and alcohol.

As another option, the dried starch can be further treated by increasing its moisture content to about 10-40% by weight and heating it at a temperature between about 90-150° C. for about 0.5-5.0 hours. In some embodiments of the process, the moisture content of the dried starch is increased to about 17-29% by weight and the starch is heated at a temperature between about 105-135° C. for about 0.5-5.0 hours.

The starch produced by the process generally is very heat-stable and shear-stable, which makes it compatible with high temperature and/or high shear processing. As a result, the starch is well-suited for use in food applications such as baking, frying, and extrusion. In addition, the starch is relatively high in total dietary fiber (TDF). The starch has low water retention and a low yellow index color. Further, the starch produced by this process displays different X-ray crystallinity characteristics and a higher melting temperature by differential scanning calorimetry (DSC) as compared to the high amylose starch used as the starting material in the process.

Resistant starch (RS) has been classified into four different types: Type I results from the starch being physically inaccessible to alpha-amylase (e.g. starch embedded in a protein or fiber matrix, such as found in whole grain); Type II is intact, native starch granules that as uncooked starch has a physical structure that is digestive resistant, but after gelatinization upon cooking is digestible (e.g. potato and banana starch); Type III is starch that has been cooked and gelatinized, or otherwise the native structure has been destroyed, and the starch molecules have re-associated themselves during the processing so that the starch is alpha-amylase resistant after cooking; and Type IV is a result of starch chemical modification which interferes with alpha-amylase digestion.

The starch in one embodiment of this invention is a Type III resistant starch. It is made by heating starch in an alcoholic medium to a temperature above its gelatinization temperature thereby destroying its native molecular organization. Then its molecular structure is re-associated through controlled cooling and heating cycles, optionally including a heat-moisture treatment after the alcohol has been removed, to impart alpha-amylase resistance.

Note that when chemically modified starch is used as the starting material, the product can be Type IV resistant starch.

The word "native" is used commonly in literature as a description of starch. The inventors use the word "native" to mean the properties of starch as it exists in the plant at harvest and upon extraction from the plant with very minimal physical treatment or chemical exposure. For example, wet milling of corn that releases starch from corn kernels requires steeping the kernels in a mild water solution of lactic acid near pH 4 and also containing about 1500 ppm $SO_2$ gas dissolved in the water. This solution penetrates the corn kernels and the $SO_2$ partially reduces proteins in the endosperm protein matrix binding the starch, thereby softening the endosperm so the starch granules can be released upon grinding the kernels. Grinding is actually quite gentle, since the wet milling operation is designed to tear apart the soft kernels, releasing starch without breaking the germ sacs containing oil. The molecular structure, the general morphology and the shape of the starch granules extracted during milling are virtually unchanged from the starch that exists in the kernels prior to milling.

Native starch is often referred to as granular, and word "granular" is often used in literature without definition. Native starch granules generally have a roughly spheroid or ellipsoid shape. They also have native molecular organization including crystallite regions and amorphous regions. The crystallite regions of native starch impart birefringence to it. Several authors refer to native starch structure as "granular structure" or the starch being in a "granular state." Although there is no standard, agreed upon definition of granular starch, it is the approximate shape of the granule that is the point of reference in this patent application. The inventors of this patent refer to and use the word "granular" in the sense of a spherical or ellipsoidal shaped starch particle. "Granule or granular" is not meant to imply native or uncooked starch or non-cold water swelling starches. It is our desire to distinguish between native, uncooked starches that have intact native crystallinity versus other granular starches that have a similar shape but have lost most or all of their native molecular organization or native crystallite structure. Non-chemically modified and some chemically modified starches that are pasted on hot rolls and scraped off the rolls generally have fragmented and glassy appearing particles of irregular shape and these starches are not referred to as "granular" by the inventors.

It is desired that the native molecular structure of starch be destroyed in the process of making the resistant starch of this invention. This is so that the molecules can re-associate into an ordered structure that results in alpha-amylase resistance. Heating the starch above its gelatinization temperature to about 150° C., as shown by carrying out the heating in a differential scanning calorimeter (DSC) to 200° C. that shows the melting range (FIG. 1), results in removal of native structure. Furthermore, holding the hot starch at mild pH conditions, such as pH 4.6-6.5, slowly reduces the average molecular weight. The reduced molecular weight is thought to better permit the molecules to re-associate into a preferred structure that is alpha-amylase resistant.

In various embodiments of this invention, the starch has been cooked to a temperature above its gelatinization point, and as it cools, and its molecules re-associate, it tends to agglomerate into a spherical shape, sometimes as fused granules inside a larger sphere. The amount of agglomeration depends on the process conditions and the variety of starch used to make the resistant starch. In a particular embodiment of this patent, HS-7 high amylose starch may be processed to result in enhanced total dietary fiber (TDF) by processing in aqueous-alcohol solution between 40% to 70% alcohol concentration by weight. However, the amount of agglomeration and resulting average particle size depends on the alcohol concentration and the molecular weight of the destroyed native molecular structure.

In one embodiment, about 82-90% by weight of the starch produced by the process has a molecular weight less than 350,000, and about 20-35% by weight has a molecular weight less than about 10,000. In certain specific embodiments of the invention, the starch has a weight average molecular weight of about 100,000 to about 250,000, about 160,000-180,000, or in some cases about 170,000. In certain embodiments, the starch has an average particle size of about 250-400 microns, or in some cases about 330 microns.

In another embodiment of the method of making an alpha-amylase resistant starch, the starch is heated in aqueous alcohol to a temperature above its gelatinization temperature, thereby destroying its native molecular structure. Then the mixture is maintained at that temperature until the starch's molecular weight has been reduced to a desirable range, followed by a single controlled cooling step and optionally a heat-moisture treatment after the alcohol has been removed to impart alpha-amylase resistance.

In another embodiment of the method of making an alpha-amylase resistant starch, high amylose starch is treated with an acid in water to reduce its molecular weight to a desirable range, and then the starch water mixture is neutralized with a base. The starch may then be concentrated or dried. The acid treated starch is then mixed with alcohol and heated to gelatinize it, thereby destroying its native molecular structure, followed by a single controlled cooling step and optionally by a heat-moisture treatment after the alcohol has been removed to impart alpha-amylase resistance.

In another embodiment, the starch is gelatinized in hot alcohol, then the temperature is reduced below the resistant starch melting point for a period of time sufficient for re-organization of the molecular structure to impart alpha-amylase resistance and heat and shear tolerance. The starch is then separated from the alcohol and water, and optionally followed by heat-moisture treatment.

Starch produced by this process can be used as a bulking agent or flour substitute in foods, such as reduced calorie baked goods. The starch is also useful for dietary fiber fortification in foods. Specific examples of foods in which the starch can be used include bread, cakes, cookies, crackers, extruded snacks, soups, frozen desserts, fried foods, pasta products, potato products, rice products, corn products, wheat products, dairy products, nutritional bars, breakfast cereals, and beverages.

The measuring procedures described below were used in the examples that follow, and are suitable for use in connection with the present invention.

Total Dietary Fiber, TDF, is the parameter indicating the degree of alpha-amylase resistance. The procedure used for determining TDF was either AOAC (Association of Official Analytical Chemists) Method 985.29 or 991.43, and was carried out using a test kit from Megazyme International Ireland Ltd. The following is a very brief description of the TDF method. Generally, in these procedures starch is dispersed in a MES/TRIS buffered water solution of pH 8.2 in which a high temperature stable alpha-amylase has been added and brought to 95-100° C. for 35 minutes. The sample is cooled to 60° C. and a protease is added and the sample is treated for 30 minutes. Then the solution is changed to pH 4.1-4.8 and glucoamylase is added to the solution. After 30 minutes at 60° C. of enzyme treatment the dietary fiber is precipitated by adding 95% alcohol. The precipitate is collected on a Celite coated crucible and dried overnight. The dry precipitate weight is measured gravimetrically, and the percent TDF is calculated based on the initial starch dry weight, so TDF is a dry basis value.

Resistant Starch as defined by Englyst (Eur. J. Clinical Nut. 1992), 46, (Suppl. 2), S33-S50) is a measure of the amount of starch that is resistant to hydrolysis by porcine pancreatin alpha-amylase at 37° C. after two hours treatment. The result is given as a percent of the initial dry starch weight.

The percent amylose in the starch was determined spectrophotometrically by measuring the intensity of blue color imparted to dissolved starch after iodine absorption.

A modulated differential scanning calorimeter, TA Instruments DSC Q1000, run in modulated mode was used to measure the melting temperature and enthalpy of starch structure.

Powder X-ray analysis was used to determine the type and amount of various crystal structure in the native starch and in the reorganized molecular structure of the alpha-amylase resistant starch.

Average molecular weight is an important descriptive measurement of the molecular organization. The measurements were carried out at the Fraunhofer Institut far Angewandte Polymerforschung, Golm, Germany. Determination of molar mass:

Preparation of Solutions

The samples were dissolved in a concentration of 0.5% in DMSO and stirred for 24 hours at room temperature and 24 hours at 95° C. The solutions were filtered with 5 µm membranes. 100 µl of the solution was injected into the GPC-MALLS instrument.

GPC-MALLS

The weight-average and number-average molar masses, $M_w$ and $M_n$, and the molar mass distribution, MMD, of the starches were determined by GPC-MALLS. The GPC system consisted of a 600 MS pump module, 717 autoinjector, column compartment, RI-detector 410 (all Waters Corp.), and MALLS detector Dawn-F-DSP laser photometer (Wyatt Technology, Santa Barbara) equipped with a S2 flow cell and an Ar-ion laser operating at $\lambda_0=488$ nm. The detection of scattered light was possible at 18 angles from 24 to 157° (but measured only at 15 angles from 35.5 to 143.4°). Elution of the samples was carried out with DMSO containing 0.09 m $NaNO_3$ at a flow rate of 0.5 mL·min$^{-1}$ and a temperature of 60° C. The MALLS detector was serially connected with the refractive index detector (DR1). The separation was performed on 20 μm SUPREMA gel columns from PSS Mainz, Germany. The set consisted of three columns with exclusion ranges of $10^8$-$10^6$ (S30000), $2 \cdot 10^6$-$5 \cdot 10^4$ (S1000), $10^5$-$10^3$ (S100) and a pre column.

The RI-chromatogram was measured with the DRI-detector. From the height of the chromatogram slice the concentration of the sample in the slice was calculated. For this purpose the dn/dc of the sample has to be known and the calibration constant of the RI-detector has to be determined. The area under the whole chromatogram corresponds to the recovered mass of the polysaccharide. This is the mass which is eluted from the column.

In addition to this measurement for every slice of the chromatogram the scattering intensity of light was measured at 15 angles with the MALLS-detector. The scattering intensity of a polymer is proportional to the molar mass and the concentration. This means, the results of both detectors, DRI and MALLS were combined for the calculation of molar mass distribution.

During the elution run the data from the DRI and MALLS detectors were collected and evaluated with ASTRA software 4.70.07 to give molar mass $M_i$ and radius of gyration $R_{gi}$ from each slice of the chromatogram. The weight average values and the number average values for molar mass and radius of gyration were calculated from these $M_i$ and $R_{gi}$ data.

A description of HPSEC-MALLS was given by Wyatt (Wyatt. Ph. *J. Anal. Chim. Acta*, 1993, 272, 1-40).

Particle size was determined on a Beckman Coulter laser analyzer, model LS13 320, in the dry powder system.

Color was measured with a Hunter Lab ColorFlex instrument and expressed as yellow index, ASTM E313.

Water binding by flour or starches is a functional parameter concerned with the rheology and baking characteristics of dough. The tests used were American Association of Cereal Chemists AACC 53-10 and 53-11. The result is expressed as grams water held per gram of starch. These methods measure the alkaline water (a solution of sodium bicarbonate or sodium carbonate) retention capacity of a starch. The alkaline water retention is the weight of alkaline water (solvent) held by starch after centrifugation. It is expressed as the ratio of weight water held per flour weight on a 14% moisture basis. Alkaline water retention is inversely correlated with cookie spread.

EXAMPLE 1

A slurry containing high amylose starch (HS-7 Variety 4200, Honen Starch Co.), measured as 71% amylose, water and denatured ethanol was prepared in the proportions shown in Table 1. The denatured ethanol was prepared by mixing a commercial ethanol, which contained 5% water by volume, with methanol, in a ratio of five gallons of methanol per 100 gallons of ethanol. The alcohol concentration given in Table 1 refers to the concentration in the alcohol/water blend including the moisture present in the starch (i.e., excluding the dry solids in the starch). For each experiment, a 1400 g batch of the slurry was prepared and placed in a 2 quart high pressure stirred autoclave fitted with internal heating coils connected to a high pressure steam source. The autoclave was sealed, purged with nitrogen and heated to the desired temperature. The desired temperatures were maintained for the times indicated in Table 1 (first at "Temp 1" for "Time 1," then at "Temp 2" for "Time 2," and then at "Temp 3" for "Time 3") and then the sample was cooled to 85° C. The product was removed using a dip leg in the reactor and placed in a 3-neck round bottom flask equipped with mechanical stirrer and the flask was placed in a water bath set at 85° C. After stirring at 85° C. for 1 hour, the bath was turned off and the sample was allowed to cool spontaneously overnight to about 30° C. The slurry was filtered and washed with 500 g of 100% denatured ethanol. The product was air dried at ambient temperature on a tray overnight.

Figure 4:
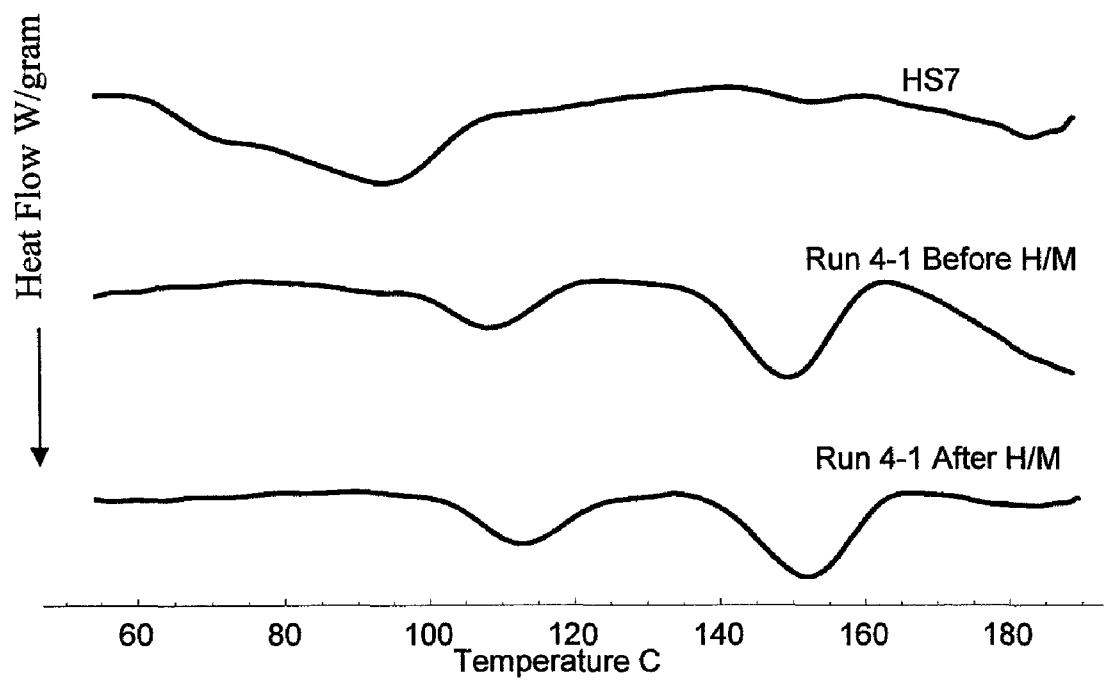
FIG. 4 shows a series of DSC thermograms of HS-7 starch, and resistant starch (sample 4-1 from the examples that follow) before heat-moisture and after heat-moisture treatment, made according to the present invention. The samples were measured at a concentration of 35% dry solids in water.

The data in Table 1 show that improved levels of dietary fiber were obtained at low starch solids and using a nucleation and propagation step as shown in the "Temp 2" and "Temp 3" columns. Additionally, a strong DSC melting point near 150° C. has been introduced or its enthalpy has been increased compared with native HS-7 starch, as shown in FIG. 4.

For two of the experiments, 1-1 and 1-2, an annealing step in aqueous alcohol was added to the process. The filter cake from the above process was reslurried in alcohol and water so that a 70/30 weight ratio of alcohol to water was obtained with 11% starch solids. The slurry was again heated in the high pressure stirred autoclave as described above to 170° C. for 45 minutes. After rapid cooling to room temperature, the product was removed, filtered and washed with 100% denatured ethanol and dried. This added annealing step did not improve the dietary fiber level or DSC melting temperature.

Table 2 shows experiments which additionally involve heat-moisture treatment in which the water content of the starch was brought to 25% while heating at 120° C. for two hours, as a post alcoholic cook treatment. When the water content of sample 2-1 was increased to 25% and it was then heated to 120° C. for 2 hours and then dried at 50° C. to 5% moisture, the dietary fiber content increased from 36% to 43%. Even better improvements in TDF were found in samples 2-2 through 2-6, with variations in the alcoholic cook. Run 2-2 exhibited 75% TDF.

EXAMPLE 2

Optimization of Heat-Moisture treatment was investigated using non-heat moisture treated resistant starch made in the pilot plant, Table 3. The material was made using generally the same method as in Example 1, but with a 100 gallon pressure reactor and a 70 lb batch. Sample 2-6 was dewatered in a Western States basket centrifuge. Then the material was dried and desolventized using a Proctor-Schwartz tray dryer to about 5% moisture and milled. Approximately 30 gram samples of the dry material were blended with water in beakers to make a range of moisture levels. The moistened materials were sealed in tubes and heated from 1 to 2 hours in an oven over a range of temperatures. The samples were cooled while in the tubes, and then samples were removed, dried and ground, and measured for TDF. The results were analyzed in a regression equation and the optimum region for heat-moisture was found. For sample 2-6, the best region was about 25% moisture and 121° C. The TDF increased from 41% after the alcoholic process to about 65% after undergoing heat-moisture treatment at the better conditions.

EXAMPLE 3

Pilot plant trials were performed using generally the same method as in Example 1, but with a 100 gallon pressure reactor and 70 lb batches. The conditions for the reactor are shown in Table 4 below. Sample 4-1 (same as sample 2-6) was dewatered in a Western States basket centrifuge. Then the material was dried and desolventized using a Proctor-Schwartz tray dryer and heat treated in a Littleford DVT-130 mixer. Sample 4-2 was prepared using the same equipment as sample 4-1, except a flash dryer was used to dry it and a Rosin fluidizer was used to desolventize the starch.

Figure 2:
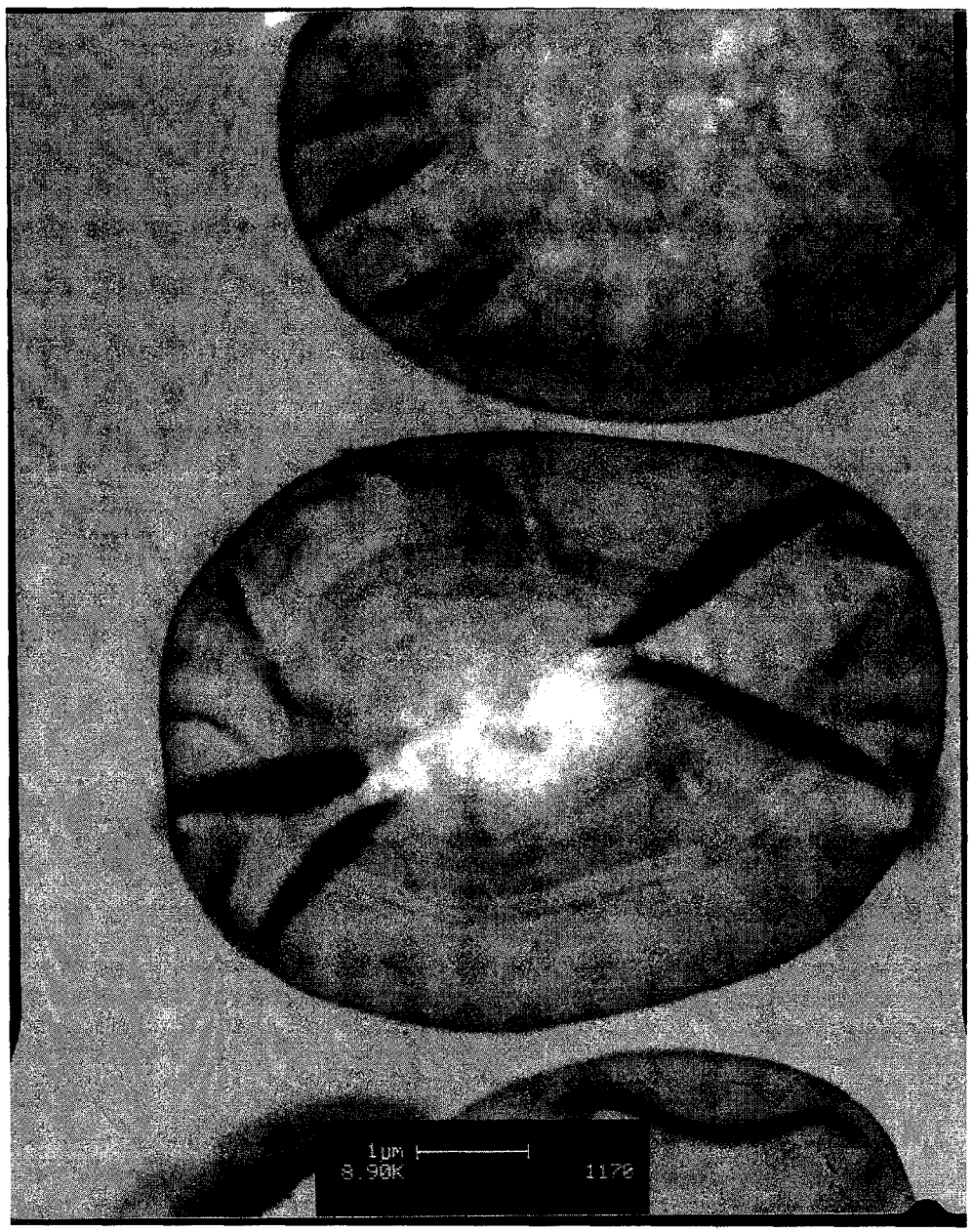
FIG. 2 is a transmission electron micrograph (TEM) of HS-7 native starch granules that are suitable for use in the process of the invention.
Figure 3:
FIG. 3 is a TEM of resistant starch particles prepared using the process of the invention.
Figure 5:
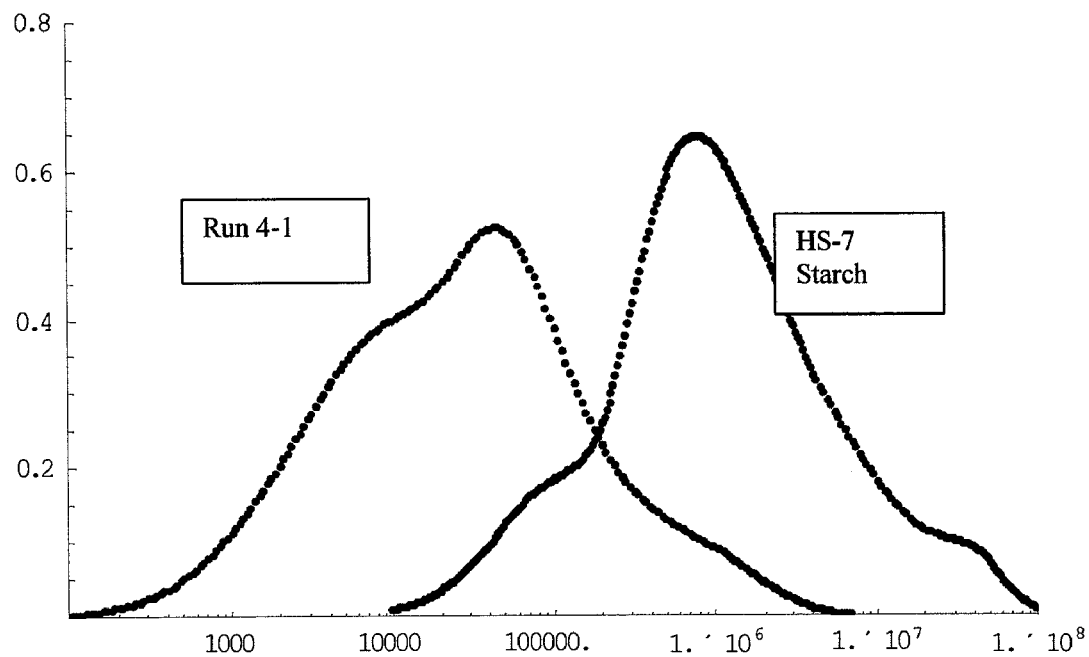
FIG. 5 shows the molecular weight distributions of HS-7 starch and resistant starch (sample 4-1).
Figure 6:
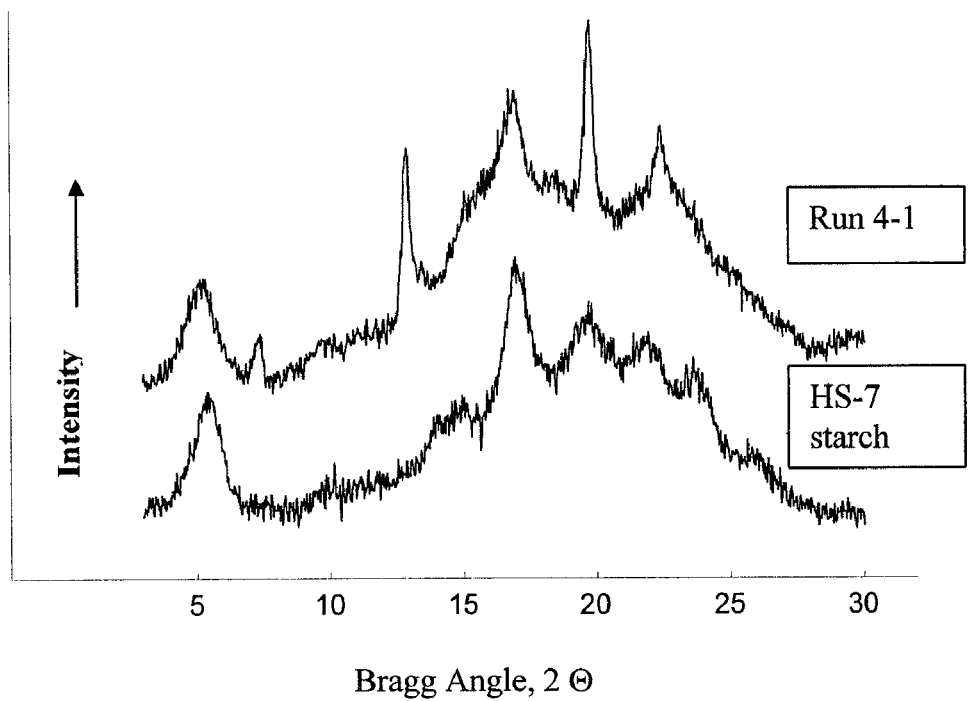
FIG. 6 indicates the X-ray scattering intensity with Bragg Angle, 2 Θ, of HS-7 starch and resistant starch (sample 4-1).

FIG. 2 is a transmission electron micrograph (TEM) of the HS-7 native starch granules that were used as the starting material. FIG. 3 is a TEM of the product of sample 4-1. The granule morphology of sample 4-1 of FIG. 3 indicates that the native granule structure seen in FIG. 2 is highly disrupted, if not completely destroyed. The DSC thermograms of FIG. 4 show that sample 4-1 after alcoholic processing and before heat-moisture treatment has lost the endotherm in the 70-100° C. range and gained an endotherm at about 110° C. and a much large endotherm about 150° C. After heat-moisture treatment there is a small shift of the endotherms to higher temperatures, by a few degrees. The molecular weight distributions of native HS-7 starch and sample 4-1 resistant starch are illustrated in FIG. 5. The weight average molecular weight of HS-7 is about 4,000,000. The weight average molecular weight of the starch in sample 4-1 is about 170,000, or a reduction of about 95%. HS-7 native granules are birefringent and show a Maltese cross in a polarizing microscope. The resistant starch granules (sample 4-1) are birefringent and "glow" in a polarizing microscope, but they do not show a distinctive Maltese cross. These results indicate that HS-7 starch is partially crystalline and it is organized as spherulites. The resistant starch's birefringence without Maltese crosses indicates the substance is partially crystalline but not organized as spherulites. FIG. 6 shows the X-ray scattering intensity of HS-7 starch and sample 4-1. HS-7 has a B type crystallinity. Sample 4-1 has a B type and V anhydrous crystallinity. It is obvious looking at FIG. 6 that there are differences between the crystal structure of HS-7 and sample 4-1. Furthermore, sample 4-1 is partially crystalline. The average particle size of HS-7 is about 10 microns and the average particle size of sample 4-1 resistant starch is 380 microns.

TABLE 1

| Run | % solids | % alcohol | Temp 1 (° C.) | Time 1 (min) | Temp 2 (° C.) | Time 2 (min) | Temp 3 (° C.) | Time 3 (min) | % TDF | Heat-Moist Step | DSC peak ° C. | enthalpy (J/g) |
|---|---|---|---|---|---|---|---|---|---|---|---|---|
| 1-1 | 8 | 50 | 150 | 60 | NA | NA | NA | NA | 31.8 | 170° C. 45 min 70% alcohol | 161 | 9.2 |
| 1-2 | 8 | 25 | 150 | 60 | NA | NA | NA | NA | 15.6 | 170° C. 45 min 70% alcohol | 149 | 3.2 |
| 1-3 | 8 | 50 | 160 | 60 | 100 | 120 | NA | NA | 35 | no | 122 / 163 | 2.2 / 1.0 |
| 1-4 | 8 | 50 | 150 | 60 | 100 | 90 | 150 | 60 | 32.2 | no | 115 / 152 | 1.3 / 9 |
| 1-5 | 8 | 50 | 150 | 60 | 120 | 180 | NA | NA | 31.3 | no | 123 / 153 | 0.47 / 7.6 |
| 1-6 | 15 | 50 | 150 | 60 | 85 | 90 | 150 | 60 | 29.6 | no | 115 / 152 | 1.6 / 9.9 |
| 1-7 | 15 | 40 | 150 | 60 | 85 | 90 | 150 | 60 | 20 | no | 118 / 163 | 1.3 / 5.3 |
| 1-8 | 15 | 30 | 144 | 60 | 85 | 90 | 145 | 60 | 24 | no | 147 | 7.2 |
| 1-9 | 8 | 50 | 150 | 60 | 85 | 90 | 150 | 60 | 37.6 | no | 111 / 157 | 3.5 / 5.7 |
| 1-10 | 8 | 50 | 150 | 60 | 85 | 150 | 140 | 90 | 39.7 | no | 155 | 7.1 |
| 1-11 | 8 | 60 | 150 | 60 | 85 | 90 | 140 | 60 | 39.5 | no | 130, | 8.0 |
| 1-12 | 8 | 50 | 160 | 60 | 85 | 180 | 140 | 180 | 26.6 | no | 106 / 118 / 148 | 1.8 / 2.8 / 3.4 |

TABLE 2

Evaluation of Heat-Moisture Treatments

| Run | % solids | % alcohol | Temp 1 (° C.) | Time 1 (min) | Temp 2 (° C.) | Time 2 (min) | Temp 3 (° C.) | Time 3 (min) | % TDF | Heat-Moist Step | DSC peak ° C. | enthalpy (J/g) |
|---|---|---|---|---|---|---|---|---|---|---|---|---|
| 2-1 | 15 | 50 | 150 | 60 | 85 | 90 | 150 | 60 | 36.1 | 25% water 120° C. 2 hr 43% TDF | 156 | 12.1 |
| 2-2 | 8 | 50 | 150 | 60 | 40 | 120 | 140 | 180 | 50.7 | 25% water 120° C. 2 hr 75% TDF | 153 | 9.7 |
| 2-3 | 8 | 50 | 150 | 15 | 85 | 180 | 140 | 180 | 44 | 25% water 120° C. 2 hr 57% TDF | 153 | 16 |
| 2-4 | 8 | 50 | 150 | 60 | 40 | 120 | 140 | 180 | 37 | 25% water 120° C. 2 hr 59% TDF | 151 | 7.9 |
| 2-5 | 8 | 50 | 150 | 15 | 40 | 120 | 140 | 180 | 40 | 25% water 120° C. 2 hr | 151 | 19.9 |

TABLE 2-continued

Evaluation of Heat-Moisture Treatments

| | | | Gelatinization/Crystallization Step | | | | | | | DSC | |
|---|---|---|---|---|---|---|---|---|---|---|---|
| Run | % solids | % alcohol | Temp 1 (° C.) | Time 1 (min) | Temp 2 (° C.) | Time 2 (min) | Temp 3 (° C.) | Time 3 (min) | % TDF | Heat-Moist Step | peak ° C. | enthalpy (J/g) |
| 2-6 | 8 | 50 | 150 | 60 | 40 | 120 | 140 | 300 | 38 | 60% TDF 25% water 120° C. 1.5 hr 50% TDF | 113 151 | 5.3 2.4 |

TABLE 3

Heat/Moisture Treatments Effects on TDF % and Water Holding
Tested with sample 2-6 resistant starch (initial TDF of 41.0%)

| Run | % H2O | temp (° C.) | time (hr) | TDF % | Water Holding Ratio |
|---|---|---|---|---|---|
| 3-1 | 15 | 200 | 1.5 | 44.4 | 1.63 |
| 3-2 | 15 | 121 | 1 | 45.9 | 1.48 |
| 3-3 | 15 | 121 | 2 | 46.0 | 1.44 |
| 3-4 | 15 | 149 | 1.5 | 54.3 | 1.27 |
| 3-5 | 25 | 93 | 1 | 50.3 | 1.48 |
| 3-6 | 25 | 93 | 2 | 55.1 | 1.50 |
| 3-7 | 25 | 121 | 1.5 | 66.5 | N/A |
| 3-8 | 25 | 121 | 1.5 | 60.0 | 1.40 |
| 3-9 | 25 | 121 | 1.5 | 72.0 | N/A |
| 3-10 | 25 | 121 | 1.5 | 72.0 | N/A |
| 3-11 | 25 | 121 | 1.5 | 68.0 | N/A |
| 3-12 | 25 | 121 | 1.5 | 60.0 | N/A |
| 3-13 | 25 | 121 | 2 | 64.6 | 1.49 |
| 3-14 | 25 | 149 | 1 | 59.2 | 1.25 |
| 3-15 | 25 | 149 | 2 | 46.3 | 1.17 |
| 3-16 | 35 | 93 | 1.5 | 58.0 | 1.77 |
| 3-17 | 35 | 121 | 1 | 53.5 | 1.59 |
| 3-18 | 35 | 121 | 2 | 58.5 | 1.49 |
| 3-19 | 35 | 149 | 1.5 | 38.1 | 1.41 |
| 3-20 | 35 | 115.5 | 1.5 | 56.9 | 1.59 |
| 3-21 | 20 | 115.5 | 1.5 | 55.4 | 1.40 |
| 3-22 | 20 | 137.8 | 1.5 | 66.0 | 1.29 |
| 3-23 | 27.5 | 93 | 1.5 | 43.2 | 1.44 |
| 3-24 | 35 | 137.8 | 1.5 | 39.3 | 1.44 |
| 3-25 | 27.5 | 137.8 | 1.5 | 48.7 | 1.41 |
| 3-26 | 35 | 137.8 | 1.5 | 54.8 | 1.39 |
| 3-27 | 35 | 93 | 1.5 | 46.0 | 1.43 |
| 3-28 | 35 | 93 | 1.5 | 50.5 | 1.62 |
| 3-29 | 20 | 93 | 1.5 | 53.3 | 1.63 |
| 3-30 | 27.5 | 115.5 | 1.5 | 67.7 | 1.50 |
| 3-31 | 20 | 93 | 1.5 | 55.0 | 1.42 |
| 3-32 | 19 | 130 | 1 | 56.0 | N/A |
| 3-33 grinding test | 25 | 121 | 1.5 | 55.1 | N/A |

N/A = not available

TABLE 4

Products used in examples

| | | | Gelatinization/Crystallization Step | | | | | | | DSC | |
|---|---|---|---|---|---|---|---|---|---|---|---|
| Run | % solids | % alcohol | Temp 1 (° C.) | Time 1 (min) | Temp 2 (° C.) | Time 2 (min) | Temp 3 (° C.) | Time 3 (min) | % TDF | Heat-Moist Step | Peak ° C. | enthalpy (J/g) |
| 4-1 | 8 | 50 | 150 | 60 | 40 | 120 | 140 | 300 | 53 | 23% water 121° C. 1.5 hr 64% TDF | 151 | 18.75 |
| 4-2 | 8 | 50 | 150 | 60 | 40 | 120 | 140 | 300 | 43 | 27% water 121° C. 1.5 hr 70% TDF | 150 | 12.55 |
| 4-3 | 8 | 50 | 150 | 60 | 40 | 120 | 140 | 300 | 41 | 28% water 121° C. 1.5 hr 63% TDF | 150 | 8.6 |

EXAMPLE 4

Analysis of certain resistant starch products of the present invention indicated the following ranges of characteristics. Particle size ranged between about 100-700 microns, more often between about 150-650 microns. The average particle size ranged between about 250-400 microns, and in some instances was about 330 microns. It should be noted that this is before any milling of the product. Powder density was about 50-60 pounds per cubic foot (packed bulk density), or in some cases about 54.

The resistant starch products almost always exhibited a DSC melting point of about 150° C. at an enthalpy of about 5-15 J/g, in some cases 10 J/g. In addition, in some instances, the resistant starch products exhibited a DSC melting point at about 108° C. at an enthalpy of about 1-9 J/g, in some cases 4.8 J/g.

Water holding capacity of the resistant starch samples was generally less than about 3 grams of water per gram of dry starch, and in many cases ranged from 1.3-1.9 grams of water per gram of dry starch. Yellow index (YI) color ranged from about 11-32, and in some cases was between about 13-27, or about 15-23. The average YI color was about 19.

TDF was greater than about 50%. In some cases, TDF was about 50-70%, about 55-70%, or about 60-70%. Englyst Resistant Starch values ranged from about 28-65, and in some cases about 35-50, with an average of about 43.

EXAMPLE 5

A 50% flour replacement of the AACC 53-10 cookie bake test was used to evaluate the performance of sample 4-3. Sample 4-3 resistant starch had been milled and screened to pass through a US Mesh 100 sieve and was collected on a US Mesh 200 sieve, the fines passing through the US Mesh 200 sieve.

According to method AOAC 991.43, 50.5% fiber was present in the ingredient prior to baking, and 100%-111% of that material was calculated as fiber following cookie baking. The data are given in Tables 5A, 5B and 5C.

The presence of resistant starch improved cookie dimensions over the control. The cookie height for the control (100% ConAgra White Spray Pastry Flour) was greater than the cookie that contained resistant starch. Additionally, cookie spread (width) was less for the control and greater for the resistant starch product. Greater spread and reduced height is due to the low water holding property of the resistant starch and indicates that the resistant starch did not hydrate or partially gelatinize during the baking process, but remained relatively unchanged. If the resistant starch did change during baking, it possibly increased in crystalline nature and produced a higher total dietary fiber value than expected.

TABLE 5A

| Ingredient | Cookie Formula "as is" | | Cookie Formula Moisture/Fat Free | |
|---|---|---|---|---|
| | Control % | Test % | Control % | Test % |
| Nonfat dry milk | 0.47 | 0.47 | 0.72 | 0.71 |
| Salt | 0.58 | 0.58 | 0.90 | 0.89 |
| Soda | 0.47 | 0.47 | 0.72 | 0.71 |
| Fine granulated Sugar | 19.67 | 19.67 | 30.39 | 29.83 |
| Fat | 18.73 | 18.73 | 0.00 | 0.00 |
| High Fructose Corn Syrup (42% Fructose) | 0.70 | 0.70 | 0.76 | 0.75 |
| Ammonium bicarbonate | 0.24 | 0.24 | 0.36 | 0.36 |
| Flour (Conagra White Spray Pastry Flour) | 47.57 | 23.46 | 66.14 | 32.02 |
| Resistant Starch | 0.00 | 24.11 | 0.00 | 34.73 |
| Water | 11.57 | 11.57 | 0.00 | 0.00 |

TABLE 5B

| | Control | Test |
|---|---|---|
| Cookie % TDF fat and moisture free | 3.18 | 21.09 |
| Contribution to TDF before baking from flour | 0 | 0 |
| Contribution to TDF before baking from resistant starch (sample 4-3) | 0 | 17.54 |
| Contribution to TDF after baking from flour | 3.18 | 1.59 |
| Contribution to TDF after baking from resistant starch (sample 4-3) | 0 | 19.5 |
| Gain of resistant starch (sample 4-3) TDF % during baking | | 11 |

TABLE 5C

Cookie Performance

| Cookie | Width (average of 4 cookies) | Height |
|---|---|---|
| All flour control | 7.28 cm | 1.25 cm |
| 50% replacement of flour with sample 2-1 | 8.19 cm | 1.08 cm |

EXAMPLE 6

Resistant starch was made in the pilot plant as generally described in Example 2, with the parameters of sample 4-3 in Table 4. After heat-moisture treatment and drying it was milled and sieved to pass through a US 60 Mesh screen. The screened product was 51.9% TDF. A blend of 25% resistant starch and 75% corn meal was extruded using a Leistritz ZSE-18/HP extruder. After extrusion the moist extrudates were dried in a convection oven with hot air flow at 250° F. for 30 minutes to about 1-2% moisture. The extrusion tests showed that about 80-85% of the TDF associated with the resistant starch remained after this severe process, confirming that it is substantially heat and shear resistant (see Table 6).

TABLE 6

Extrusion Test Data

| | Corn Meal Control | Test 1 | Test 2 | Test 3 |
|---|---|---|---|---|
| Moisture in Extruder, % | 18 | 18 | 25 | 21 |
| Die Pressure, PSI | 1236 | 1370 | 567 | 822 |
| Product Temperature, ° C. | 150 | 156 | 147 | 158 |
| KW/Kg | 0.084 | 0.110 | 0.120 | 0.142 |
| TDF, % | 3.6 | 12.8 | 12.2 | 12.6 |
| Resistant Starch Stability, % | | 84 | 79 | 83 |

EXAMPLE 7

Resistant starch stability was tested in a tortilla chip composition. Resistant starch (sample 4-1), 69% TDF, replaced 25% of white corn masa flour. Sample 4-1 was obtained and heat-moisture treated in a lab apparatus at 121° C. at 25% moisture for 90 minutes for this test. The white corn masa flour TDF was 8.0%, from its specification sheet. Table 7 shows the dry mixed ingredients of the tortilla blends. The blends were mixed with water to make a dough, which was sheeted with a Rondo reversible sheeter to make flat pieces. The sheeted pieces were cut, baked, and fried as described in Table 8. The fried pieces were defatted with petroleum ether then measured for their TDF. The TDF results and analysis are given on a fat and moisture free basis. Table 8 shows the TDF analysis and the calculations that compare the TDF of the initial ingredients and of the prepared foods. During the process of making the chips, the TDF of both corn masa and the resistant starch increased. Calculations show the TDF of the resistant starch increased by 25%, thus the resistant starch appeared to be 86% TDF after baking and frying. The resistant starch made by this process is stable in this application, and may gain TDF in baking/frying of this application.

TABLE 7

Composition of dry mixture used to make tortilla chips

| Ingredient | Control % | Test (25% corn masa replacement with resistant starch sample 4-1), % |
|---|---|---|
| White Corn Masa, Azeta Milling Co. | 93.1 | 69.83 |

TABLE 7-continued

Composition of dry mixture used to make tortilla chips

| Ingredient | Control % | Test (25% corn masa replacement with resistant starch sample 4-1), % |
|---|---|---|
| X-PAND'R ® starch, A.E. Staley Manufacturing Co. | 4.9 | 4.9 |
| Resistant starch (sample 4-1) | 0 | 23.27 |
| Salt | 1 | 1 |
| Corn Oil | 0.5 | 0.5 |
| Centrolex F Lecithin, Central Soya Co. | 0.5 | 0.5 |

TABLE 8

Tortilla chip composition and frying/baking results

| Ingredient | Control | Test 25% corn masa replacement with sample 4-1 |
|---|---|---|
| Dry Mixture of Table 7 | 300 grams | 300 grams |
| Added water for sheeting | 250 grams | 250 grams |
| Dough Moisture % | 46-48 | 46-48 |
| Dough Characteristics | Cohensive, sheeted well | Wet, Non-sticky |
| Baking | 450° F., 1.5 minutes | 450° F., 1.5 minutes |
| Expected Moisture before frying, % | 15-25 | 15-25 |
| Frying Parameters | 345° F.-350° F., 35-40 seconds | 345° F.-350° F., 35-40 seconds |
| Fat after baking and frying, % | 22.6 | 23.7 |
| TDF % of defatted chips | 10.2 | 27.7 |
| TDF % contributed by corn masa before baking and frying | 7.4 | 5.6 |
| TDF % contributed by sample 4-1 before baking and frying | 0 | 16.0 |
| Percent gain of TDF from of corn masa | 38 | N/A |
| Calculated % TDF contributed to Tortilla by ingredient after baking and frying on fat and water free basis | 10.2 (measured) | 7.7 from corn masa 20 from sample 4-1 (by difference) |
| Percent gain of TDF from resistant starch sample 4-1 | N/A | 25 |

The preceding description of specific embodiments of the invention is not intended to be a list of every possible embodiment of the invention. Persons skilled in the art will recognize that other embodiments would be within the scope of the following claims.

What is claimed is:

1. A method of making an alpha-amylase resistant starch, comprising:
heating starch comprising at least about 65% by weight amylose in aqueous alcohol to a temperature above its gelatinization temperature, thereby destroying its native molecular structure;
maintaining the mixture at or above the gelatinization temperature for about 60-480 minutes; and
cooling the starch.

2. The method of claim 1, further comprising separating the starch from the alcohol and treating the starch by increasing its moisture content to about 10-40% by weight and heating it at a temperature of about 90-150° C. for about 0.5-5.0 hours to impart alpha-amylase resistance.

* * * * *